April 30, 1929.  W. F. FOSBURY  1,710,818

FEED WATER HEATER OR CONDENSER

Filed Jan. 18, 1928

INVENTOR.
WILLIAM F. FOSBURY
BY A. B. Bouman
ATTORNEY

Patented Apr. 30, 1929.

1,710,818

UNITED STATES PATENT OFFICE.

WILLIAM F. FOSBURY, OF CULVER CITY, CALIFORNIA.

FEED-WATER HEATER OR CONDENSER.

Application filed January 18, 1928. Serial No. 247,584.

My invention relates to feed water heaters or condensers for utilizing exhaust steam from steam engines, pumps, etc., and for heat transfer from one liquid to another and for raising the temperature of air by steam, hot gases or hot liquids for use in dwelling houses, public halls, etc., and the principal objects of my invention are; first, to provide an apparatus of this class in which there is a continuous thin flow of liquid fluid in one direction through the apparatus and a continuous thin flow of vapor fluid for changing the temperature of the first mentioned fluid flowing in the opposite direction through said apparatus; second, to provide an apparatus of this class which will reduce to a minimum the liability of getting out of order by reason of expansion of and contraction and crystallization of the main conducting elements; third, to provide an apparatus of this class which may be readily taken apart for cleaning, repairing and the like; fourth, to provide an apparatus of this class in which the parts will not readily crystallize by reason of vibration; fifth, to provide an apparatus of this class in which some of the spacing plates are reinforced and provided with separators for the fluid passing therethrough; sixth, to provide an apparatus of this class the separate parts of which will not corrode together due to the continuous action of the expanding and contracting members; seventh, to provide an apparatus of this class that causes the liquid to become turbulent thereby causing said liquid to be broken up and causing a more even distribution of the heat transfer through the body of the liquid; eighth, to provide an apparatus of this class that will not become air locked due to the design of the heat transfer plates; ninth, to provide a novelly constructed apparatus of this class; and, tenth, to provide an apparatus of this class which is very simple, economical of construction, durable, efficient in its action and which will not readily deteriorate or get out of order.

Figure 1:
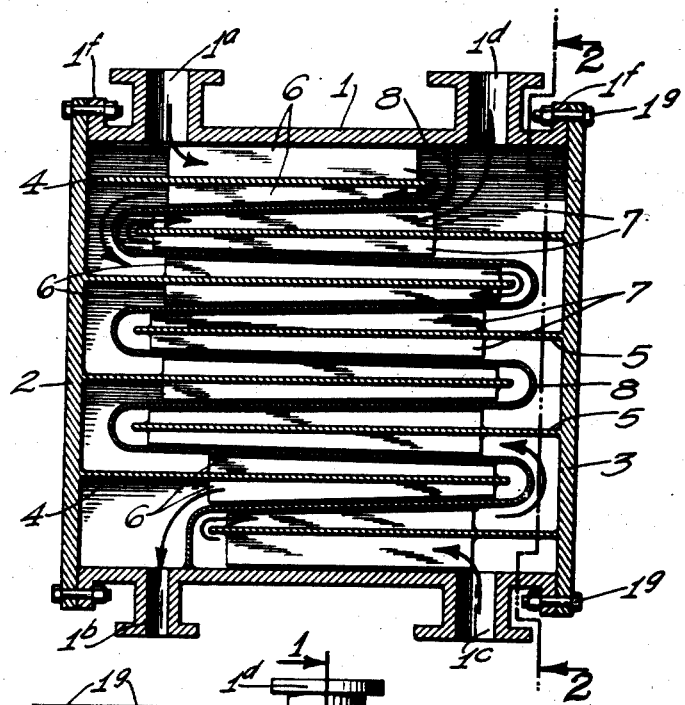
Figure 2:
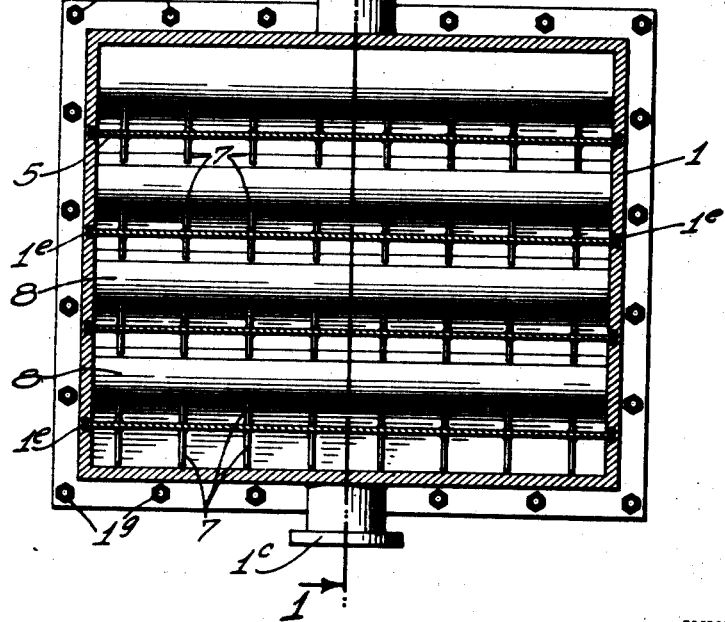

With these and other objects in view as will appear hereinafter, my invention consists of certain novel features of construction, combination and arrangement of parts and portions as will be hereinafter described in detail and particularly set forth in the appended claims, reference being had to the accompanying drawings and to the characters of reference thereon which form a part of this application in which:

Figure 1 is a transverse sectional view through 1—1 of Fig. 2; and Fig. 2 is a sectional view on the line 2—2 of Fig. 1.

Similar characters of reference refer to similar parts and portions throughout the views of the drawings.

A casing comprising the main casing member 1, side plates 2 and 3 which form baffle supporting members, baffle members 4 and 5, reinforcing ribs 6 and 7, and continuous zigzag fluid directing partition plate 8 constitutes my apparatus in its preferred form.

The main casing member 1 is preferably a rectangularly shaped, hollow casing member provided with fluid inlet ports 1$^a$ and 1$^c$ and fluid outlet ports 1$^b$ and 1$^d$, and provided in its side walls with a plurality of notches 1$^e$ as shown best in Fig. 2 of the drawings. It is provided around its outer side with a flange 1$^f$ which is provided with a plurality of holes adapted for the bolts 1$^g$. Secured to the opposite sides of this member 1 are the side plates 2 and 3, which form baffle supporting members, the plates being secured to the member 1 by means of the bolts 1$^g$, which pass through the flanges 1$^f$, as shown best in Fig. 1 of the drawings, thus forming a complete casing for my feed water heater or condenser. Secured to the inner sides of the members 2 and 3 are the baffle plates 4 and 5 which are preferably secured thereto by welding. It will be noted that the upper baffle plate on the member 2 and the lower baffle plate on the member 3 are shorter than the remaining baffle plates, and that the remaining baffle plates extend nearly across the space between the plates 2 and 3. The baffle plates 4 which are secured to the side plate or support 2 are provided on opposite sides with rib members 6 which are positioned intermediate the ends of the baffle plates 4 and 5 and extend a suitable distance along each side as shown best in Fig. 1 of the drawings and they are placed in spaced relation to each other for directing more uniformly the fluid through the apparatus, and serve to reinforce the interior of the structure.

Interposed between the edges of the rib members and around the ends of the baffle plates is a thin continuous zigzag plate partition 8 which extends from the upper side of the casing 1, some distance from the side with the outlet 1ª, and is welded to the casing at both top and bottom sides and at the ends forming a continuous zigzag guide for the fluids moving in both directions through the apparatus.

Thus it will be noted that the member 8 is secured to the casing 1 in general zigzag form from the upper to the lower side, forming a zigzag partition in said casing 1 and the baffle plates 4 and 5 are spaced at their inner edges some distance from the bend and leaving a passageway so that these baffle plates form a guide for the fluid in opposite directions, it being noted that the sides of the baffle plates 4 and 5 are positioned in notches 1 in the side walls of the casing 1 with sufficient play around the same to permit movement with the expansion and contraction and slight vibration. The reinforcing and distributing ribs 6 and 7 are spaced at their outer edges a slight distance from the member 8 to permit slight movement but serve as reinforcement when they move under pressure.

It will be noted that this apparatus may be used for heating or cooling vapors or liquid fluids and that the vapor may move in either direction through the apparatus and the liquid in either direction as long as it is in the opposite direction; or, both the vapor and fluid may move through the apparatus in the same direction, if desired, although it is preferred that one be moved in the opposite direction to the other. It will also be noted that the inlets and outlets of the fluid and vapor or either of them may be positioned in the members 2 and 3 as well as in the casing 1, it being obvious that it is immaterial where these inlets and outlets are positioned so long as they communicate with the space near the opposite ends and on opposite sides of the zigzag partition 8.

Though I have shown and described a particular construction, combination and arrangement of parts and portions, I do not wish to be limited to this particular construction, combination and arrangement but desire to include in the scope of my invention the construction, combination and arrangement substantially as set forth in the appended claims.

Having thus described my invention, what I claim as new and desire to secure by Letters Patent is:

1. In an apparatus of the class described, a hollow, rectangular casing member provided with open sides, a zigzag partition therein extending from near one open side to near the opposite open side, side plates, carrying baffle plates on their inner sides, which baffle plates extend into the extended zigzag portions of said partition with their inner ends spaced from said partition, and reinforcing ribs secured on opposite sides of said baffle plates and extending toward said zigzag partition.

2. In an apparatus of the class described, a hollow, rectangular casing member provided with open sides, a zigzag partition therein extending from near one open side to near the opposite open side, side plates, carrying baffle plates on their inner sides, which baffle plates extend into the extended zigzag portions of said partition with their inner ends spaced from said partition, reinforcing ribs secured on opposite sides of said baffle plates and extending toward said zigzag partition, and inlet and outlet means communicating with said casing at the opposite ends of said zigzag partition and on opposite sides of said zigzag partition.

3. In an apparatus of the class described, a hollow casing, a thin zigzag metallic partition therein, plates positioned in the extended zigzag portions of said partition on opposite sides thereof forming a continuous zigzag passage on each side of said partition from one side to the other of said casing, and a plurality of fluid directing plates positioned between said first mentioned plates and the adjacent portions of said partition for uniformly directing fluid through the apparatus.

4. In an apparatus of the class described, a hollow casing, a thin zigzag metallic partition therein and plates positioned in the extended zigzag portions of said partition on opposite sides thereof forming a continuous zigzag passage on each side of said partition from one side to the other of said casing, and means positioned between said plates and said zigzag partition adapted to reinforce said zigzag partition and said plates but adapted to permit slight movement of either.

5. In an apparatus of the class described, a hollow casing, a thin metallic zigzag partition therein, plates positioned in the extended zigzag portions of said partition on opposite sides thereof forming a continuous passage on each side of said partition from one side to the other of said casing, and means positioned between said plates and said zigzag partition adapted to reinforce said zigzag partition and said plates but to permit slight movement of either, consisting of a plurality of rib members in spaced relation to each other secured to said plates.

6. In an apparatus of the class described, a hollow casing, a thin zigzag metallic partition therein, plates positioned in the extended zigzag portions of said partition on opposite sides thereof forming a continuous passage on opposite sides of said partition from one side to the other of said casing, and means positioned between said plates and said zigzag partition adapted to reinforce said zigzag partition and said plates but to permit slight movement of either, consisting of a plurality of rib members in spaced relation to each other secured to said plates, and inlet and outlet means at opposite ends of said casing and on opposite sides of said partition.

7. In an apparatus of the class described, a thin metallic zigzag partition, means for conducting fluids contiguous to and on opposite sides of said partition, and other means for uniformly distributing said fluids over the surface of said partition.

8. In an apparatus of the class described, a hollow casing, a thin zigzag metallic partition positioned therein with its zigzag edges secured to opposite walls of the casing, and plates loosely and yieldably positioned between the extended zigzag portions of the partition and yieldably mounted on the walls to which the zigzag edges of the partition are secured.

In testimony whereof, I have hereunto set my hand at Los Angeles, California, this 24th day of December, 1927.

WILLIAM F. FOSBURY.